United States Patent
Terasaka et al.

(10) Patent No.: US 11,541,857 B2
(45) Date of Patent: Jan. 3, 2023

(54) BRAKING CONTROL DEVICE OF VEHICLE (71) Applicant: ADVICS CO., LTD., Kariya (JP)

(72) Inventors: Masato Terasaka, Kariya (JP); Chisa Kitahara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 407 days.

(21) Appl. No.: 16/767,924

(22) PCT Filed: Nov. 29, 2018

(86) PCT No.: PCT/JP2018/044098
§ 371 (c)(1),
(2) Date: May 28, 2020

(87) PCT Pub. No.: WO2019/107523
PCT Pub. Date: Jun. 6, 2019

(65) Prior Publication Data
US 2020/0290578 A1 Sep. 17, 2020

(30) Foreign Application Priority Data
Nov. 29, 2017 (JP) .............................. JP2017-228625

(51) Int. Cl.
B60T 8/1764 (2006.01)
B60T 8/1755 (2006.01)
(Continued)

(52) U.S. Cl.
CPC .......... B60T 8/1764 (2013.01); B60T 8/1755 (2013.01); B60T 8/246 (2013.01); B60T 13/746 (2013.01);
(Continued)

(58) Field of Classification Search
CPC ...... B60T 8/1764; B60T 8/1755; B60T 8/246; B60T 13/748; B60T 13/662;
(Continued)

(56) References Cited

U.S. PATENT DOCUMENTS

2005/0029754 A1 2/2005 Ueno et al.
2011/0077834 A1 3/2011 Kudo et al.
(Continued)

FOREIGN PATENT DOCUMENTS

| CN | 1576124 A | 2/2005 |
|---|---|---|
| JP | H06344884 A | 12/1994 |
| JP | 2011073575 A | 4/2011 |

OTHER PUBLICATIONS

International Search Report (PCT/ISA/210) dated Mar. 5, 2019, by the Japan Patent Office as the International Searching Authority for International Application No. PCT/JP2018/044098.
(Continued)

Primary Examiner — Russell Frejd
(74) Attorney, Agent, or Firm — Buchanan Ingersoll & Rooney PC (57) ABSTRACT In the case that the road surface is determined to have different friction coefficients on the left and right wheels, this braking control device performs antiskid control for adjusting the increase slope of front wheel braking torque on the side with the higher friction coefficient. A steering angle sensor detects the steering angle, and a yaw rate sensor detects the yaw rate. The device calculates a reference turning amount on the basis of the steering angle, calculates an actual turning amount on the basis of the yaw rate, and sets the increase slope on the basis of the deviation between the reference turning amount and the actual turning amount. Also, if this deviation becomes larger, a correction is made such that the set increase slope becomes smaller. Further, if the deviation becomes smaller, a correction is made such that the set increase slope becomes larger.

4 Claims, 5 Drawing Sheets (51) Int. Cl.
*B60T 8/24* (2006.01)
*B60T 13/74* (2006.01)

(52) U.S. Cl.
CPC ..... *B60T 2210/124* (2013.01); *B60T 2250/03* (2013.01)

(58) Field of Classification Search
CPC ............. B60T 13/686; B60T 2210/124; B60T 2250/03; B60T 2270/30; B60T 7/12
See application file for complete search history.

(56) References Cited

U.S. PATENT DOCUMENTS

| | | | |
|---|---|---|---|
| 2017/0232944 A1* | 8/2017 | Owen | B60T 8/245 701/94 |
| 2017/0247023 A1* | 8/2017 | Owen | B60T 8/241 |
| 2021/0179042 A1* | 6/2021 | Terasaka | B60T 8/1755 |

OTHER PUBLICATIONS

Written Opinion (PCT/ISA/237) dated Mar. 5, 2019, by the Japan Patent Office as the International Searching Authority for International Application No. PCT/JP2018/044098.

\* cited by examiner

TIME OF SHARP TURN

FIG. 5A

SPLIT ROAD

BRAKING CONTROL DEVICE OF VEHICLE

TECHNICAL FIELD

The present invention relates to a braking control device of vehicle.

BACKGROUND ART

Patent Literature 1 discloses that, for the purpose of "ensuring stability of a vehicle at the time of braking on left/right split road surface, and the like and prevent increase in braking distance with an ABS vehicle", "when an antiskid control is activated on one of the left and right wheels of the vehicle, a controller of the device executes a fluid pressure increasing speed change control of changing the fluid pressure increase of an opposite wheel of the left and right wheels on which the antiskid control is not activated according to a deviation of a generated yaw rate and a target yaw rate. In the antiskid control after both wheels have reached the antiskid control, a reference slip rate change control according to the yaw rate deviation can be added. The steering stability of the vehicle at the initial stage of braking on the left and right split road surface is ensured, and both prevention of yaw rate generation at the time of turning braking and prevention of increase in braking distance are compatible".

Patent Literature 2 describes a device that, in addition to the antiskid control on the split road surface, for the purpose of "improving with satisfactory responsiveness instability of the vehicle at the time of understeer and performing while maintaining the amplitude of a correction steering by a driver within a constant range", "includes a turning direction determination means that determines a turning direction of a vehicle, and a pressure increase/decrease control means that executes a turning understeer specifying control when a pressure increasing mode is set for a control mode, and that applies a pressure increase restriction of the pressure increase control in the antiskid control based on an absolute value of a steering angle deviation calculated by a steering angle deviation calculation means with respect to a front wheel on an outer side of turning determined on the basis of the turning direction determined by the turning direction determination means and decrease a pressure increase slope of the pressure increase control the larger the absolute value". In this device, oversteer of the vehicle is determined, and when the absolute value of the steering angle deviation is larger than the threshold value and the vehicle is not oversteered, the pressure increase slope is decreased.

In the antiskid control, there is a trade-off relationship between directional stability and deceleration ability of the vehicle. If the pressure increase slope (also referred to as "increase slope") of the pressure increase control is decreased, the directional stability is improved. On the other hand, if the pressure increase slope is increased, the deceleration ability of the vehicle is increased. Therefore, in the braking control device of the vehicle that executes the antiskid control, it is desired that the above-mentioned trade-off relationship be suitably compatible.

CITATIONS LIST

Patent Literature

Patent Literature 1: Japanese Unexamined Patent Publication No. 6-344884

Patent Literature 2: Japanese Unexamined Patent Publication No. 2011-73575

SUMMARY OF INVENTION

Technical Problems

An object of the present invention is to provide a braking control device of a vehicle that executes an antiskid control so that the directional stability and the deceleration ability of the vehicle can be suitably compatible.

Solutions To Problems

A braking control device of a vehicle according to the present invention includes an actuator (HU) that individually adjusts a braking torque (Tq) of a wheel (WH) of the vehicle; and a controller (ECU) that executes an antiskid control that adjusts an increase slope (Kz) of a braking torque (Tq) of a front wheel on a high friction coefficient side through the actuator (HU) when a road surface having a different friction coefficient between left and right wheels (WH) of the vehicle is determined. The braking control device further includes a steering angle sensor (SA) that detects a steering angle (Sa) of a steered wheel (WHi, WHj) of the vehicle; and a yaw rate sensor (YR) that detects a yaw rate (Yr) of the vehicle.

In the braking control device of the vehicle according to the present invention, the controller (ECU) is configured to calculate a reference turning amount (Tr) based on the steering angle (Sa), calculate an actual turning amount (Ta) based on the yaw rate (Yr), set the increase slope (Kz) based on a deviation (hT) between the reference turning amount (Tr) and the actual turning amount (Ta), and correct the increase slope (Kz) to be smaller when the deviation (hT) increases. Furthermore, the controller (ECU) corrects the increase slope (Kz) to be larger when the deviation (hT) is reduced.

When the antiskid control is activated on a road surface (o-called split road) having different friction coefficients between the left and right wheels WH of the vehicle, a braking force difference due to the difference in friction coefficient occurs at the front wheels. Since this braking force difference causes the vehicle to deflect, a shift occurs between the vehicle direction intended by the driver and the actual vehicle direction. According to the above configuration, the increase slope Kz is set based on the turning amount deviation hT so as to suppress the directional shift. At this time, the increase slope Kz is set smaller than a case where the split road is not determined. Furthermore, when the turning amount deviation hT increases, the set increase slope Kz is corrected to be smaller. At the time the turning amount deviation hT is increased, the increase slope Kz is decreased but is still too large. Thus, the increase slope Kz is further corrected to become smaller, and the directional shift is immediately suppressed. On the other hand, when the turning amount deviation hT is reduced, the set increase slope Kz is corrected to be larger. At the time the turning amount deviation hT is reduced, the increase slope Kz is in a sufficiently decreased state. Thus, the increase slope Kz is corrected to gradually become larger, and vehicle deceleration is ensured.

A braking control device of a vehicle according to the present invention includes an actuator (HU) that individually adjusts a braking torque (Tq) of a wheel (WH) of the vehicle; and a controller (ECU) that executes an antiskid control that adjusts an increase slope (Kz) of a braking torque (Tq) of a front wheel on an outer side of turning of the vehicle through the actuator (HU) when a sharp turn of the vehicle is determined. The braking control device further includes a steering angle sensor (SA) that detects a steering angle (Sa) of a steered wheel (WHi, WHj) of the vehicle; and a yaw rate sensor (YR) that detects a yaw rate (Yr) of the vehicle.

In the braking control device of the vehicle according to the present invention, the controller (ECU) is configured to calculate a reference turning amount (Tr) based on the steering angle (Sa), calculate an actual turning amount (Ta) based on the yaw rate (Yr), set the increase slope (Kz) based on a deviation (hT) between the reference turning amount (Tr) and the actual turning amount (Ta), and correct the increase slope (Kz) to be smaller when the deviation (hT) increases. Furthermore, the controller (ECU) corrects the increase slope (Kz) to be larger when the deviation (hT) is reduced.

When the vehicle is turning, the load on the inner side of turning reduces, and the load on the outer side of turning increases. When the antiskid control is activated in this state, a braking force difference due to the difference in the vertical load occurs at the front wheels. This braking force difference causes the actual vehicle to deflect to the outer side of turning more than the vehicle direction intended by the driver (so-called understeer of the vehicle increases). According to the configuration described above, the increase slope Kz is set based on the turning amount deviation hT so as to suppress the understeer. At this time, the increase slope Kz is set to be smaller than that in a case where the sharp turn of the vehicle is not determined. Furthermore, when the turning amount deviation hT increases, the set increase slope Kz is corrected to be smaller. At the time the turning amount deviation hT is increased, the increase slope Kz is decreased but is still too large. Thus, the increase slope Kz is further corrected to be smaller, and the understeer is immediately suppressed. On the other hand, when the turning amount deviation hT is reduced, the set increase slope Kz is corrected to be larger. At the time the turning amount deviation hT is reduced, the increase slope Kz is in a sufficiently decreased state. Thus, the increase slope Kz is corrected to gradually become larger, and vehicle deceleration is ensured.

DESCRIPTION OF EMBODIMENT

<Symbols of Configuring Members, etc., Subscripts at the End of the Symbols, and Motion/Moving Direction>

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders is described as wheel cylinder CWi of the right front wheel, wheel cylinder CWj of the left front wheel, wheel cylinder CWk of the right rear wheel, and wheel cylinder CWl of the left rear wheel. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The subscripts "1" and "2" added to the end of various symbols are comprehensive symbols indicating which of the two braking systems they relate to. Specifically, "1" indicates the first system and "2" indicates the second system. For example, in the two master cylinder fluid passages, they are expressed as a first master cylinder fluid passage HM1 and a second master cylinder fluid passage HM2. Furthermore, the subscripts "1" and "2" at the end of the symbol can be omitted. When the subscripts "1" and "2" are omitted, each symbol represents a generic name of each of the two braking systems. For example, "HM" represents the master cylinder fluid passage of each braking system.

<Embodiment of a Braking Control Device of a Vehicle According to the Present Invention>

Figure 1:
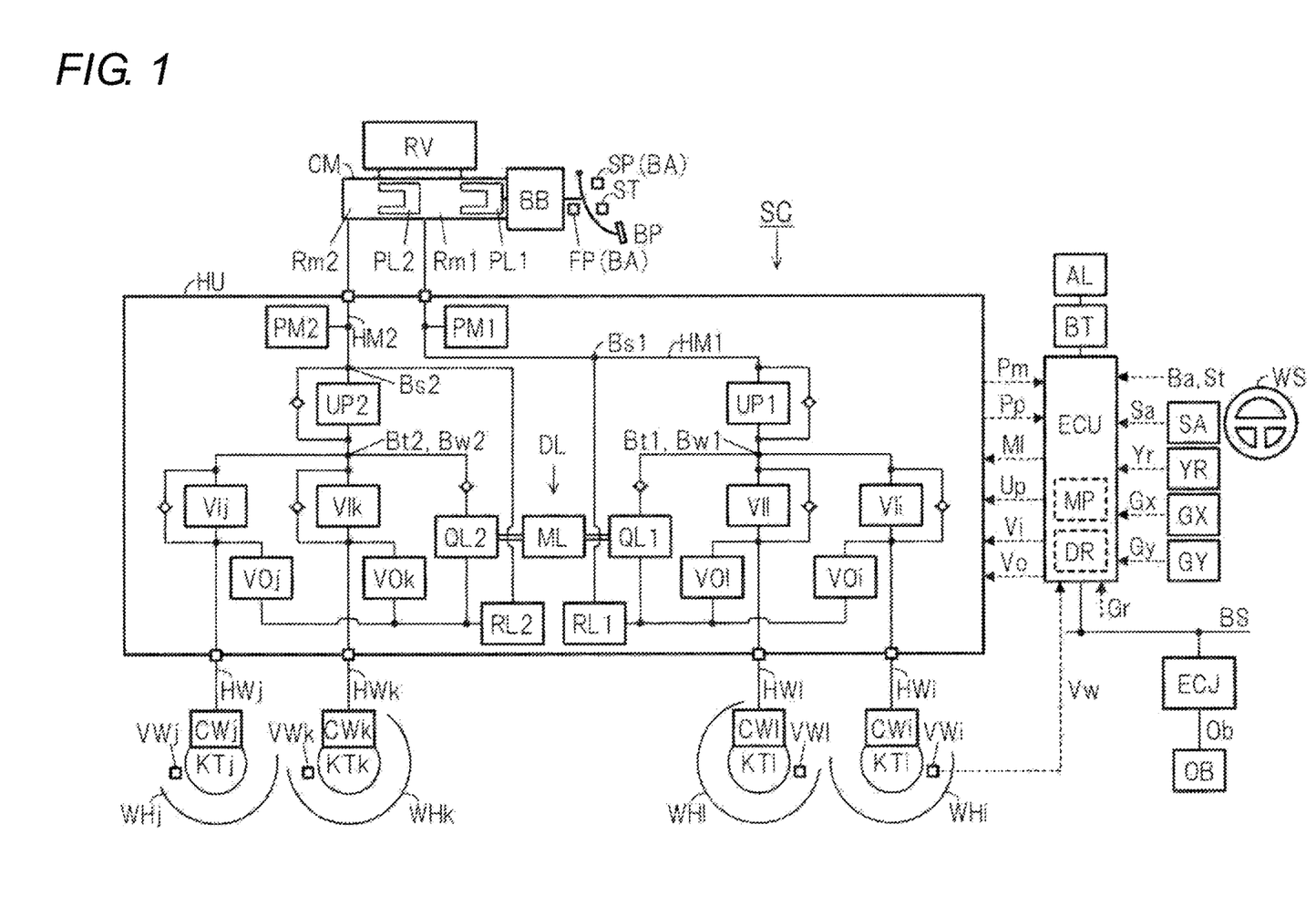
FIG. 1 is an overall configuration view describing an embodiment of a braking control device SC of a vehicle according to the present invention.

An embodiment of a braking control device SC according to the present invention will be described with reference to an overall configuration view of FIG. 1. A master cylinder CM is connected to a wheel cylinder CW by way of a master cylinder fluid passage HM and a wheel cylinder fluid passage HW. The fluid passage is a passage for moving brake fluid BF which is the working fluid of the braking control device SC, and corresponds to a brake piping, a fluid path of a fluid unit, a hose, and the like. The inside of the fluid passage is filled with the brake fluid BF. In the fluid passage, the side closer to the reservoir RV is called "upstream", and the side closer to the wheel cylinder CW is called "downstream".

The vehicle employs two systems of fluid passages. A first system (system related to a first master cylinder chamber Rm1) of the two systems of fluid passages is connected to the wheel cylinders CWi and CWl. A second system (system related to a second master cylinder chamber Rm2) of the two systems of fluid passages is connected to the wheel cylinders CWj and CWk. That is, in the first embodiment, a so-called diagonal type (also referred to as "X type") is adopted as the two-system fluid passage.

The vehicle equipped with the braking control device SC includes a braking operation member BP, a wheel cylinder CW, a reservoir RV, a master cylinder CM, and a brake booster BB. The braking operation member (e.g., brake pedal) BP is a member operated by the driver to decelerate the vehicle. The braking torque Tq of the wheel WH is adjusted, and the braking force is generated at the wheel WH by operating the braking operation member BP.

A rotating member (e.g., brake disc) KT is fixed to each wheel WH of the vehicle. The brake caliper is arranged so as to sandwich the rotating member KT. The wheel cylinder CW is provided on the brake caliper, and as the pressure (brake fluid pressure) Pw of the brake fluid BF in the wheel cylinder CW is increased, a friction member (e.g., brake pad) is pressed against the rotating member KT. Since the rotating member KT and the wheel WH are fixed to rotate integrally, the braking torque Tq is generated at the wheel WH by the frictional force generated at this time. The braking torque Tq causes a deceleration slip on the wheel WH, and as a result, a braking force is generated.

The reservoir (atmospheric pressure reservoir) RV is a tank for the working fluid, and the brake fluid BF is stored inside. The master cylinder CM is mechanically connected to the braking operation member BP by way of a brake rod, a clevis (U-shaped link) and the like. The master cylinder CM is a tandem type, and its interior is divided into master cylinder chambers Rm1 and Rm2 by master pistons PL1 and PL2. When the braking operation member BP is not operated, the master cylinder chambers Rm1, Rm2 of the master cylinder CM are in a communicating state with the reservoir RV. Master cylinder fluid passages HM1 and HM2 are connected to master cylinder CM. When the braking operation member BP is operated, the master pistons PL1, PL2 move forward, and the master cylinder chambers Rm1, Rm2 are shut off from the reservoir RV. When the operation of the braking operation member BP is increased, the brake fluid BF is pressure fed from the master cylinder CM toward the wheel cylinder CW through the master cylinder fluid passages HM1, HM2.

The operation force Fp of the braking operation member BP by the driver is reduced by the brake booster (also simply referred to as "booster") BB. A negative pressure type booster BB is adopted. The negative pressure is generated by an engine or an electric negative pressure pump. As the booster BB, that which uses an electric motor as a drive source may be employed (e.g., an electric booster, an accumulator type hydraulic booster).

The vehicle includes a wheel speed sensor VW, a steering angle sensor SA, a yaw rate sensor YR, a longitudinal acceleration sensor GX, a lateral acceleration sensor GY, a braking operation amount sensor BA, an operation switch ST, and a distance sensor OB. Each wheel WH of the vehicle includes a wheel speed sensor VW to detect the wheel speed Vw. The signal of the wheel speed Vw is used for independent control of each wheel such as antiskid control for suppressing the lock tendency of the wheel WH (i.e., excessive deceleration slip).

A steering operation member (e.g., steering wheel) WS is provided with a steering angle sensor SA for detecting a steering angle Sa (steering angles of the steered wheels WHi and WHj). The body of the vehicle includes a yaw rate sensor YR to detect a yaw rate (yaw angular velocity) Yr. Furthermore, the longitudinal acceleration sensor GX and the lateral acceleration sensor GY are provided to detect the acceleration (longitudinal acceleration) Gx in the longitudinal direction (advancing direction) of the vehicle and the acceleration (lateral acceleration) Gy in the lateral direction (direction perpendicular to the advancing direction).

A braking operation amount sensor BA is provided so as to detect an operation amount Ba of the braking operation member BP (brake pedal) by the driver. As the braking operation amount sensor BA, at least one of a master cylinder fluid pressure sensor PM that detects the fluid pressure of the master cylinder CM (master cylinder fluid pressure) Pm, an operation displacement sensor SP that detects the operation displacement Sp of the braking operation member BP, and an operation force sensor FP that detects the operation force Fp of the braking operation member BP is adopted.

An operation switch ST is provided on the braking operation member BP. The operation switch ST detects whether the driver operated the braking operation member BP. When the braking operation member BP is not operated (that is, at the time of non-braking), an off signal is output as the operation signal St. On the other hand, when the braking operation member BP is operated (that is, at the time of braking), an on signal is output as the operation signal St.

The vehicle is provided with a distance sensor OB so as to detect a distance (relative distance) Ob between an object existing in front of the own vehicle (another vehicle, fixed object, person, bicycle, etc.) and the own vehicle. For example, a camera, a radar, or the like is employed as the distance sensor OB. The distance Ob is input to a controller ECJ. The controller ECJ calculates a required deceleration Gr based on the relative distance Ob.

<<Electronic Control Unit ECU>>

The braking control device SC is configured by a controller ECU and a fluid unit HU (corresponding to an "actuator").

The controller (also referred to as "electronic control unit") ECU is configured to include an electric circuit substrate on which a microprocessor MP or the like is mounted and a control algorithm programmed in the microprocessor MP. The controller ECU is network-connected to another controller (e.g., driving support controller ECJ) through an in-vehicle communication bus BS so as to share signals (detected values, calculated values, etc.). The driving support controller ECJ transmits a required deceleration Gr (target value) for executing the automatic braking control so as to avoid a collision with an object (e.g., an obstacle) in front of the vehicle. In the controller ECU, automatic braking control is executed based on the required deceleration Gr.

A braking operation amount Ba, a braking operation signal St, a wheel speed Vw, a yaw rate Yr, a steering angle Sa, a longitudinal acceleration Gx, a lateral acceleration Gy, and a required deceleration Gr are input to the braking controller ECU. The controller ECU (electronic control unit) controls the electric motor ML of the fluid unit HU and electromagnetic valves UP, VI, and VO based on the input signals. Specifically, based on the control algorithm, drive signals Up, Vi, and Vo for controlling the electromagnetic valves UP, VI, and VO are calculated, and a drive signal M1 for controlling the electric motor ML is calculated.

The controller ECU includes a drive circuit DR for driving the electromagnetic valves UP, VI, VO, and the electric motor ML. In the drive circuit DR, a bridge circuit is formed by switching elements (power semiconductor devices such as MOS-FET and IGBT) to drive the electric motor ML. Furthermore, in the drive circuit DR, switching elements are provided so as to drive the electromagnetic valves UP, VI, and VO, and their energized states (i.e., excited states) are controlled. The drive circuit DR is provided with an energization amount sensor (current sensor) that detects the actual energization amount (supply current) of the electric motor ML and the electromagnetic valves UP, VI, and VO.

<<Fluid Unit HU>>

A known fluid unit HU is provided between the master cylinder CM and the wheel cylinder CW. The fluid unit (actuator) HU includes an electric pump DL, a low-pressure reservoir RL, a pressure adjusting valve UP, a master cylinder fluid pressure sensor PM, an inlet valve VI, and an outlet valve VO.

The electric pump DL includes one electric motor ML and two fluid pumps QL1 and QL2. When the fluid pumps QL1 and QL2 are rotated by the electric motor ML, the brake fluid BF is pumped from suction portions Bs1 and Bs2 (upstream side of the pressure adjusting valve UP). The pumped brake fluid BF is discharged to discharge portions Bt1 and Bt2 (downstream side of the pressure adjusting valve UP). The low-pressure reservoirs RL1, RL2 are provided on the suction sides of the fluid pumps QL1, QL2.

The pressure adjusting valves UP1 and UP2 are provided in the master cylinder fluid passages HM1 and HM2. A linear type electromagnetic valve (also referred to as "differential pressure valve") is adopted as the pressure adjusting valve UP where a valve opening amount (lift amount) is continuously controlled based on the energized state (e.g., supply current). A normally-open electromagnetic valve is employed as the pressure adjusting valve UP1. UP2. A target energization amount of the pressure adjusting valve UP is determined based on the calculation results (e.g., target fluid pressure of the wheel cylinder CW) of the vehicle stabilization control, the automatic braking control, and the like. The drive signal Up is determined based on the target energization amount, the energization amount (current) to the pressure adjusting valve UP is adjusted, and the valve opening amount is adjusted.

When the fluid pump QL is driven, a reflux of the brake fluid BF is formed. When energization to the pressure adjusting valve UP is not carried out and the normally-open pressure adjusting valve UP is in a fully opened state, the fluid pressure (master cylinder fluid pressure Pm) on the upstream side of the pressure adjusting valve UP and the fluid pressure on the downstream side of the pressure adjusting valve UP substantially match. When the energization amount to the normally-open pressure adjusting valve UP is increased and the valve opening amount of the pressure adjusting valve UP is decreased, the reflux of the brake fluid BF is reduced, and the downstream fluid pressure is increased by the orifice effect from the upstream fluid pressure Pm. As the electric pump DL and the pressure adjusting valve UP are controlled, the brake fluid pressure Pw is increased from the master cylinder fluid pressure Pm corresponding to the operation of the braking operation member BP. The master cylinder fluid pressure sensors PM1, PM2 are provided on the upstream side of the pressure adjusting valve UP so as to detect the master cylinder fluid pressures Pm1, Pm2. Since "Pm1=Pm2", one of the master cylinder fluid pressure sensors PM1 and PM2 can be omitted.

Specifically, the master cylinder fluid passages HM1, HM2 are branched into wheel cylinder fluid passages HWi to HW1 at branch parts Bw1, Bw2. An inlet valve VI and an outlet valve VO are provided in the wheel cylinder fluid passage HW. A normally-open ON/OFF electromagnetic valve is adopted as the inlet valve VI, and a normally-closed ON/OFF electromagnetic valve is adopted as the outlet valve VO. The electromagnetic valves VI and VO are controlled by the controller ECU based on the drive signals Vi and Vo. The brake fluid pressure Pw of each wheel can be independently controlled by the inlet valve VI and the outlet valve VO.

In the inlet valve VI and the outlet valve VO, the configuration related to each wheel WH is the same. A normally-open inlet valve VI is provided in the wheel cylinder fluid passage HW (fluid passage connecting the part Bw and the wheel cylinder CW). The wheel cylinder fluid passage HW is connected to the low-pressure reservoir RL through a normally-closed outlet valve VO at a downstream part of the inlet valve VI.

For example, in the antiskid control, in order to decrease the fluid pressure (brake fluid pressure) Pw in the wheel cylinder CW, the inlet valve VI is set to the closed position and the outlet valve VO is set to the open position. The inflow of the brake fluid BF from the inlet valve VI is inhibited, the brake fluid BF in the wheel cylinder CW flows out to the low-pressure reservoir RL, and the brake fluid pressure Pw is decreased. Furthermore, in order to increase the brake fluid pressure Pw, the inlet valve VI is set to the open position and the outlet valve VO is set to the closed position. The outflow of the brake fluid BF to the low-pressure reservoir RL is inhibited, the downstream fluid pressure adjusted by the pressure adjusting valve UP is introduced into the wheel cylinder CW, and the brake fluid pressure Pw is increased.

The braking torque Tq of the wheel WH is increased/decreased (adjusted) by increasing/decreasing the brake fluid pressure Pw. When the brake fluid pressure Pw is increased, the force with which the friction material is pressed against the rotating member KT is increased, and the braking torque Tq is increased. As a result, the braking force of the wheel WH is increased. On the other hand, when the brake fluid pressure Pw is decreased, the pressing force of the friction material with respect to the rotating member KT is reduced, and the braking torque Tq is decreased. As a result, the braking force of the wheel WH is reduced.

<Calculation Process in Controller ECU>

Figure 2:
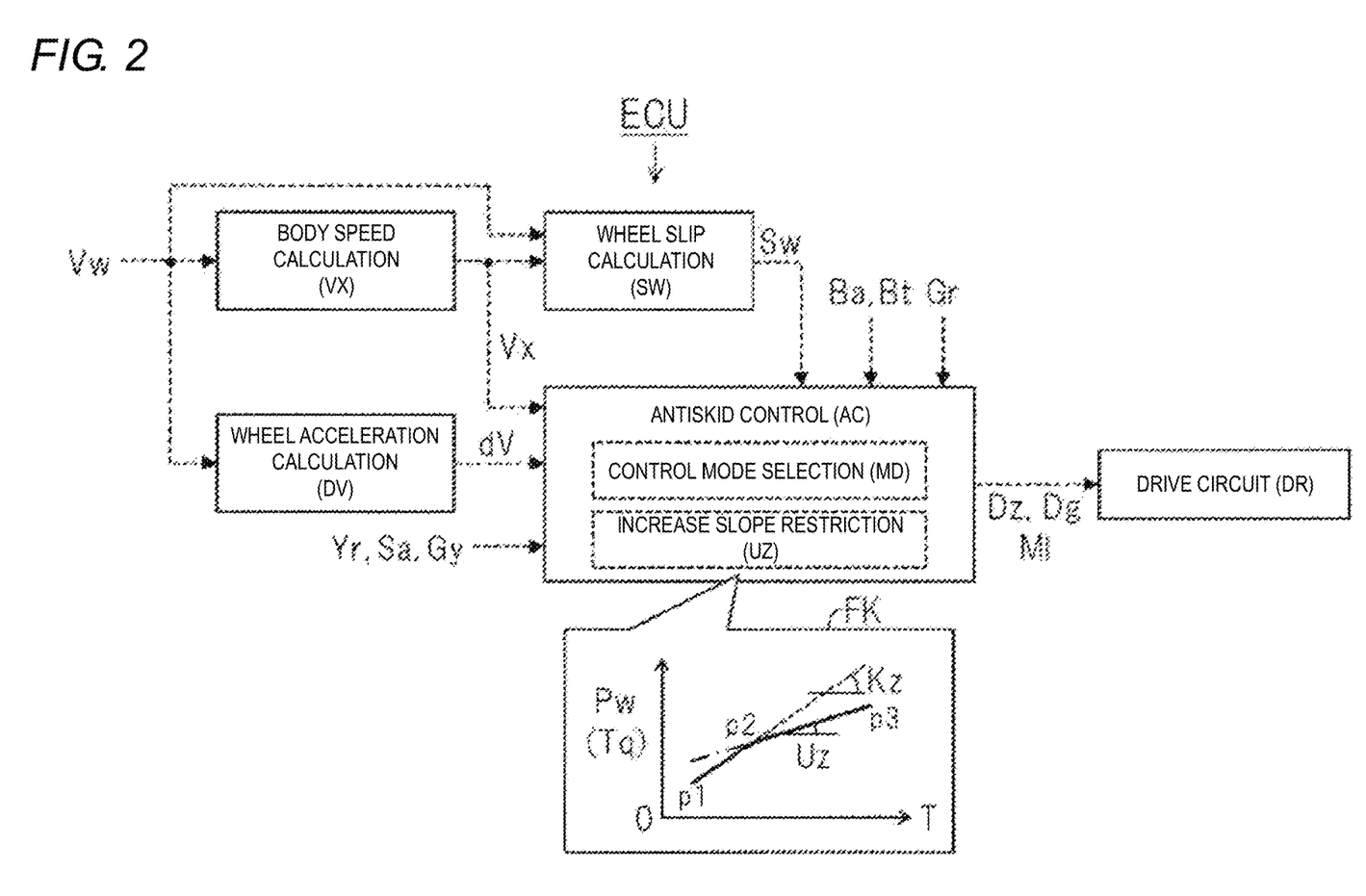
FIG. 2 is a function block diagram for explaining a calculation process in a controller ECU.

The calculation in the controller ECU will be described with reference to the function block diagram of FIG. 2. A wheel speed Vw, a yaw rate Yr, a steering angle Sa, a lateral acceleration Gy, a braking operation amount Ba, a braking operation signal St, and a required deceleration Gr are input to the controller ECU. The braking controller ECU includes a body speed calculation block VX, a wheel acceleration calculation block DV, a wheel slip calculation block SW, an antiskid control block AC, and a drive circuit DR.

In the body speed calculation block VX, the body speed Vx is calculated based on the wheel speed Vw. For example, at the time of non-braking including acceleration of the vehicle, the body speed Vx is calculated based on the slowest (slowest wheel speed) of the four wheel speeds Vw. At the time of braking, the body speed Vx is calculated based on the fastest (fastest wheel speed) of the four wheel speeds Vw. Furthermore, in the calculation of the body speed Vx, a limit may be imposed on the time change amount. That is, an upper limit value αup of the increase slope and a lower limit value αdn of the decrease slope of the body speed Vx are set, and the change in the body speed Vx is limited by the upper and lower limit values αup, αdn.

In the wheel acceleration calculation block DV, a wheel acceleration dV (time change amount of the wheel speed Vw) is calculated based on the wheel speed Vw. Specifically, the wheel speed Vw is time differentiated to calculate the wheel acceleration dV.

In the wheel slip calculation block SW, a deceleration slip (also referred to as "wheel slip") Sw of the wheel WH is calculated based on the body speed Vx and the wheel speed Vw. The wheel slip Sw is a state quantity representing the degree of grip of the wheel WH with respect to the traveling road surface. For example, a deceleration slip speed (deviation between the body speed Vx and the wheel speed Vw) hV of the wheel WH is calculated as the wheel slip Sw (hV=Vx−Vw). Furthermore, a wheel slip ratio (=hV/Vx) in which the slip speed (speed deviation) hV is made dimensionless with the body speed Vx may be adopted as the wheel slip Sw.

In the antiskid control block AC, the antiskid control is executed based on the wheel acceleration dV, the wheel slip Sw, the braking operation amount Ba, the operation signal St, the required deceleration Gr, the body speed Vx, the yaw rate Yr, the steering angle Sa, and the lateral acceleration Gy. Specifically, first, "whether or not braking is in progress" is determined based on at least one of the braking operation amount Ba, the operation signal St, and the required deceleration Gr. When at least one condition of "the braking operation amount Ba is greater than or equal to a predetermined value bo", "the operation signal St is in the ON state", and "the required deceleration Gr is greater than or equal to a predetermined value go" is satisfied, and affirmative determination is made for "braking is in progress", start of execution of the antiskid control is permitted in each wheel WH.

In the antiskid control block AC, "whether or not the road surface on which the vehicle is traveling is a split road in which the friction coefficient greatly differs between left and right wheels" is determined. Before the antiskid control is started, the same brake fluid pressure Pw (i.e., braking torque Tq) is applied to the left and right front wheels. For example, the split road is determined to be a "split road" when a difference of greater than or equal to a predetermined value occurs between the left and right front wheels in at least one of the wheel acceleration dV and the wheel slip Sw. At this time, among the left and right wheels, the wheel on the high friction coefficient side and the wheel on the low friction coefficient side are identified.

In the antiskid control block AC, "whether or not the vehicle is turning sharply" is determined. For example, the determination on the sharp turn of the vehicle is performed based on the actual lateral acceleration Gy. When the lateral acceleration Gy is greater than or equal to a predetermined value gy, the turning state of the vehicle is determined to be a sharp turning state. On the other hand, when the lateral acceleration Gy is less than the predetermined value gy, the sharp turn of the vehicle is not determined. Here, the predetermined value gy is a preset constant. When the body speed Vx is considered, the lateral acceleration can be calculated based on the yaw rate Yr or the steering angle Sa. Therefore, the determination on the sharp turn of the vehicle is determined based on at least one of the lateral acceleration Gy, the yaw rate Yr, and the steering angle Sa. In this case as well, similar to the above, the presence/absence of the sharp turning state of the vehicle is determined based on the comparison with the predetermined value gy.

The turning direction of the vehicle is identified along with the determination of a sharp turn. The turning direction is identified based on at least one of the lateral acceleration Gy, the yaw rate Yr, and the steering angle Sa. Furthermore, based on the turning direction, the outer wheel and the inner wheel are identified in the turning, and the front wheel on the outer side of turning is specified. Specifically, the front wheel on the outer side of turning is determined to be the right front wheel WHi when turning left and the left front wheel WHj when turning right.

Execution of the antiskid control in each wheel WH (i.e., adjustment of fluid pressure Pw of each wheel cylinder CW) is performed by selecting one of the decreasing mode (pressure decreasing mode) Mg and the increasing mode (pressure increasing mode) Mz. Here, the decreasing mode Mg and the increasing mode Mz are generically called "control modes" and are determined by a control mode selecting block MD included in the antiskid control block AC. Specifically, in the control mode selecting block MD, a plurality of threshold values are set in advance so as to determine each control mode of the antiskid control. Either one of the decreasing mode Mg or the increasing mode Mz is selected based on the mutual relationship between these threshold values and "the wheel acceleration dV and the wheel slip Sw". In addition, in the control mode selecting block MD, the decrease slope Kg in the decreasing mode Mg (time change amount at the time of decrease of the brake fluid pressure Pw) and the increase slope Kz in the increasing mode Mz (time change amount at the time of increase of the brake fluid pressure Pw) is determined based on the mutual relationship. Then, the duty ratio Dg of the outlet valve VO is calculated based on the decrease slope Kg. Furthermore, the duty ratio Dz of the inlet valve VI is determined based on the increase slope Kz. Here, the "duty ratio" is a ratio of the energization time (ON time) per unit time.

The antiskid control block AC includes an increase slope restricting block UZ. When the antiskid control is executed on the split road by the increase slope restricting block UZ, the increase slope Kz of the front wheel on the higher friction coefficient side is restricted. Furthermore, in the antiskid control at the time of a sharp turn of the vehicle, the increase slope Kz of the front wheel on the outer side of turning is restricted. In the increase slope restricting block UZ, the deflection state quantity Ds is calculated based on the actual yaw rate Yr and the steering angle Sa. Then, the final limit value Uz is calculated based on the deflection state quantity Ds, and the increase slope Kz is limited to the limit value Uz. A detailed calculation method of the deflection state quantity Ds and the limit value Uz will be described later.

The relationship between the increase slope Kz and the final limit value Uz will be described with reference to the time-series diagram of a blowing unit FK. The time-series diagram shows a change in the brake fluid pressure Pw (i.e., braking torque Tq) with respect to time T. The non-restricted (i.e., before restriction) increase slope Kz indicated by the broken line is a change amount of the brake fluid pressure Pw with respect to time T. When the antiskid control is executed on one of the left and right front wheels and antiskid control is not executed on the other wheel, the increase slope Kz before restriction of the other front wheel (i.e., the front wheel on the high friction coefficient side, or the front wheel on the outer side of turning) is determined according to the operation (particularly, operation speed) of the braking operation member BP. Furthermore, in the braking by the automatic braking control, the increase slope Kz before restriction is determined by the time change amount of the required deceleration Gr. When the antiskid control is executed on the left and right front wheels, the increase slope Kz before restriction is instructed by the controller ECU by at least one of the wheel acceleration dV and the wheel slip Sw.

The increase slope Kz is limited by a limit value Uz (target value) indicated by a dashed line. If the increase slope Kz does not exceed the limit value Uz, the increase slope Kz is left as it is (line segment p1-p2). On the other hand, if the increase slope Kz exceeds the limit value Uz, the increase slope Kz (target value) is determined to be the limit value Uz (line segment p2-p3). As a result, as shown by the solid line, the actual increase slope Kz is decreased from the increase slope Kz before restriction (broken line) and instructed (line segment p1-p2-p3). When the target increase slope Kz is decreased, the duty ratio Dz of the normally-open inlet valve VI is increased. The time of the closed position of the inlet valve VI is lengthened (i.e., the inlet valve VI is driven more toward the closing side), and the actual increase slope Kz is decreased. For example, in the front wheel on the high friction coefficient side, restriction is given by the limit value Uz with respect to the increase slope Kz (value corresponding to at least one of braking operation amount Ba, required deceleration Gr, wheel acceleration dV, and wheel slip Sw, increase slope Kz before restriction) of when the antiskid control is executed on a road surface that is not a split road (i.e., when the split road is not determined), and the increase slope Kz is adjusted to decrease from the increase slope Kz before restriction. Similarly, when a sharp turn is determined for the front wheel on the outer side of turning, the increase slope Kz is adjusted to decrease from the increase slope Kz before restriction (i.e., when the sharp turn is not determined).

When the decreasing mode Mg is selected and the brake fluid pressure Pw is decreased by the antiskid control, the inlet valve VI is closed and the outlet valve VO is opened. That is, the pressure increasing duty ratio Dz is determined to be "100% (always energized)", and the outlet valve VO is driven based on the pressure decreasing duty ratio Dg. The brake fluid BF in the wheel cylinder CW is moved to the low-pressure reservoir RL, and the brake fluid pressure Pw is decreased. Here, the pressure decreasing speed (time slope in decreasing the brake fluid pressure Pw, decrease slope) is determined by the duty ratio Dg of the outlet valve VO. "100%" of the pressure decreasing duty ratio Dg corresponds to the normally-open state of the outlet valve VO, and the brake fluid pressure Pw is rapidly decreased. The closed position of the outlet valve VO is achieved by "Dg=0% (non-energization)".

When the increasing mode Mz is selected and the brake fluid pressure Pw is increased by the antiskid control, the inlet valve VI is opened and the outlet valve VO is closed. That is, the pressure decreasing duty ratio Dg is determined to be "0%", and the inlet valve VI is driven based on the pressure increasing duty ratio Dz. The brake fluid BF is moved from the master cylinder CM to the wheel cylinder CW, and the brake fluid pressure Pw is increased. The pressure increasing speed (time slope in increasing the brake fluid pressure, increase slope Kz) is adjusted by the duty ratio Dz of the inlet valve VI. "0%" of the pressure increasing duty ratio Dz corresponds to the normally-open state of the inlet valve VI, and the brake fluid pressure Pw is rapidly increased. The closed position of the inlet valve VI is achieved by "Dz=100% (always energized)".

When the brake fluid pressure Pw needs to be maintained by the antiskid control, the outlet valve VO or the inlet valve VI is always in the closed state in the decreasing mode Mg or the increasing mode Mz. Specifically, in the decreasing mode Mg, when it is necessary to maintain the brake fluid pressure Pw, the duty ratio Dg of the outlet valve VO is determined to be "0% (normally-closed state)". Furthermore, in the increasing mode Mz, when it is necessary to maintain the brake fluid pressure Pw, the duty ratio Dz of the inlet valve VI is determined to be "100% (normally-closed state)".

In the drive circuit DR, the electromagnetic valves VI, VO and the electric motor ML are driven based on the pressure increasing/decreasing duty ratios Dz, Dg and the drive signal Ml. In the drive circuit DR, a drive signal Vi for the inlet valve VI is calculated based on the pressure increasing duty ratio Dz, and a drive signal Vo for the outlet valve VO is determined based on the pressure decreasing duty ratio Dg so as to execute the antiskid control. Furthermore, the drive signal Ml is calculated so as to drive the electric motor ML at a predetermined rotation number set in advance. The brake fluid BF is returned from the low-pressure reservoir RL to the upstream part Bt of the inlet valve VI by the drive of the electric motor ML.

<First Calculation Example in Increase Slope Restricting Block UZ>

Figure 3:
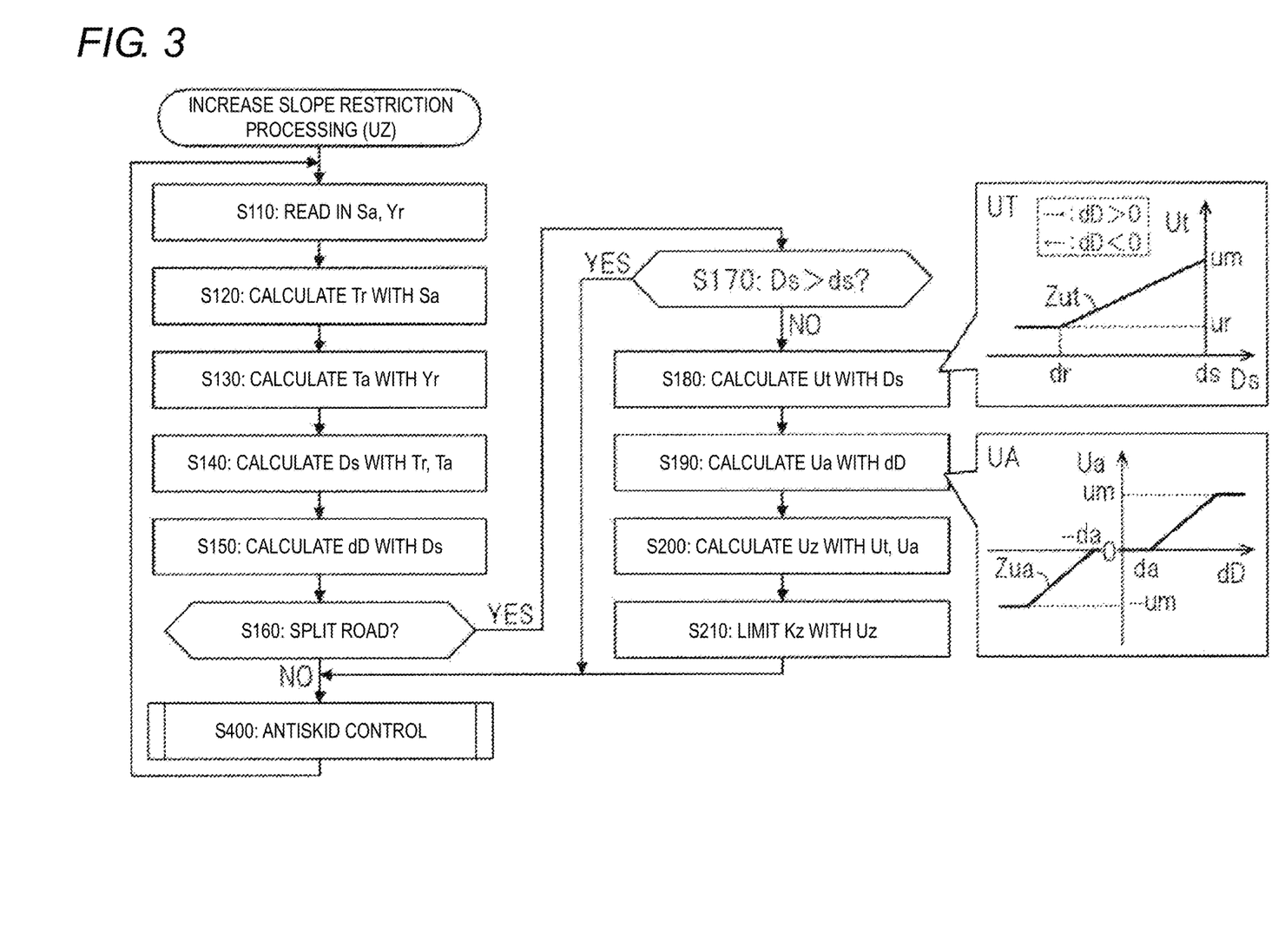
FIG. 3 is a control flowchart for explaining a first calculation example in an increase slope restricting block UZ.

With reference to the control flowchart of FIG. 3, a first calculation processing example in the increase slope restricting block UZ will be described. This process is executed on the assumption that the antiskid control on a split road (also referred to as a "μsplit road") in which the friction coefficient differs between the left and right wheels started on at least one of the left and right front wheels. In the increase slope restricting block UZ, a limit value Uz is calculated so as to limit and decrease adjust the increase slope Kz of the front wheel on the high friction coefficient side.

<<Turning Direction>>

First, the direction of each state quantity (yaw rate Yr, steering angle Sa, lateral acceleration Gy, etc.) will be described. The turning direction of the vehicle includes a left direction and a right direction. In order to distinguish the turning direction, the straight traveling state of the vehicle is set to "0 (neutral position)", and the sign of each state quantity represents the turning direction. In the following description, "left turning direction" is represented by "positive sign (+)", and "right turning direction" is represented by "negative sign (−)".

In step S110, a steering angle Sa and a yaw rate Yr are read. The steering angle Sa (e.g., operation angle of the steering wheel WS), which is a steering angle of the steered wheels (front wheels) WHi and WHj is detected by the steering angle sensor SA. The yaw rate Yr, which is the rotation angular speed of the vehicle about a vertical axis, is detected by the yaw rate sensor YR. In step S120, a reference turning amount Tr is calculated based on the steering angle Sa. The reference turning amount Tr is a state quantity indicating the vehicle traveling direction intended by the driver. In other words, the reference turning amount Tr is a state variable that represents the traveling direction of the vehicle when all wheels WH have a slight slip and are in a grip state. In step S130, the actual turning amount Ta is calculated based on the actual yaw rate Yr. The actual turning amount Ta is a state quantity representing the actual traveling direction of the vehicle as a result of the driver's steering operation and the antiskid control (i.e., the difference between the left and right braking forces). Here, the reference turning amount Tr and the actual turning amount Ta are calculated as the same physical quantity.

For example, the reference turning amount Tr and the actual turning amount Ta are calculated as the same physical quantity in the dimension of the yaw rate. In this case, the reference turning amount Tr (reference yaw rate) is determined based on a predetermined relationship in consideration of the steering angle Sa, the body speed Vx, and the stability factor. At this time, the actual yaw rate Yr is determined as is as the actual turning amount Ta (Ta=Yr). Alternatively, the reference turning amount Tr and the actual turning amount Ta are calculated in the dimension of the steering angle. In this case, the steering angle Sa is determined as is as the reference turning amount Tr (Tr=Sa). Then, the actual turning amount Ta is calculated based on the yaw rate Yr, the body speed Vx, and a predetermined relationship. In any case, the reference turning amount Tr is calculated based on the steering angle Sa, and the actual turning amount Ta is calculated based on the yaw rate Yr.

In step S140, the deflection state quantity Ds is calculated based on the deviation hT between the reference turning amount Tr and the actual turning amount Ta and the direction sgnTa of the actual turning amount Ta. The deflection state quantity Ds is a state quantity representing the degree of deflection of the vehicle with respect to the steering angle Sa. In other words, the deflection state quantity Ds is a state variable expressing the magnitude of the influence of the left-right difference of the front wheel braking force due to the split road or the load shift at the time of turn of the vehicle. Specifically, the deflection state quantity Ds is calculated by the following equation (1).

$$Ds = \mathrm{sgn}\, Ta \cdot (Tr - Ta) = \mathrm{sgn}\, Ta \cdot hT \qquad \text{Equation (1)}$$

Here, sgn is a sign function (also referred to as a "signum function"), and is a function that returns any of "plus 1", "minus 1", and "0" according to the sign of the argument. Since the actual turning amount Ta is calculated based on the actual yaw rate Yr, the direction sgnTa of the actual turning amount Ta matches the direction sgnYr of the actual yaw rate Yr.

In step S150, a time change amount (referred to as "deflection change amount") dD of the deflection state quantity Ds is calculated. The deflection change amount dD is calculated by time-differentiating the deflection state quantity Ds. For example, the deflection state quantity Ds in the previous calculation cycle and the deflection state quantity Ds in the current calculation cycle are compared to determine the deflection change amount dD. The deflection change amount dD is a state quantity indicating that the turning amount deviation hT (=Tr−Ta) is increasing or reducing.

In step S160, "whether or not the road surface on which the vehicle is traveling is a split road in which the friction coefficient differs greatly between left and right wheels" is determined. The presence or absence of the split road is determined based on at least one of the wheel acceleration dV and the wheel slip Sw. Specifically, when a difference greater than or equal to a predetermined value occurs between the left and right front wheels in the state quantities dV and Sw, determination is made as the "split road". In step S160, of the left and right wheels, the wheel on the high friction coefficient side and the wheel on the low friction coefficient side are identified.

In step S170, "whether or not the deflection state quantity Ds is greater than a first threshold value ds" is determined. Here, the first threshold value ds is a constant for determination set in advance. For example, the first threshold value ds is determined as "0". Alternatively, the first threshold value ds can be set as a range having a predetermined width. If "Ds>ds: YES", the increase slope Kz is not adjusted (restricted). The process proceeds to step S400, and normal antiskid control is executed. In this case, the pressure increasing duty ratio Dz of the front wheel on the high friction coefficient side is determined by "increase slope Kz before adjustment corresponding to at least one of the braking operation amount Ba and the required deceleration Gr" or "increase slope Kz before adjustment calculated based on at least one of the wheel acceleration dV and the wheel slip Sw". That is, the pressure increasing duty ratio Dz, which is equivalent to the case where the split road is not determined, is calculated.

On the other hand, if "Ds≤ds: NO" and negative determination is made in step S170, the process proceeds to step S180. In step S180, a limit reference value Ut (target value) is calculated based on the deflection state quantity Ds.

The calculation of the limit reference value Ut will be described with reference to the blowing unit UT. The limit reference value Ut is calculated based on the deflection state quantity Ds and a calculation map Zut set in advance. In "Ds>ds", the limit reference value Ut is not calculated, and the increase slope Kz is not restricted. In "Ds≤ds", the limit reference value Ut is calculated according to the deflection state quantity Ds. When the deflection state quantity Ds is less than the predetermined value dr, the limit reference value Ut is calculated to a predetermined value ur (lower limit value). When the deflection state quantity Ds is greater than or equal to the predetermined value dr and less than or equal to the first threshold value ds, the limit reference value Ut is calculated to increase from the predetermined value ur toward the predetermined value um as the deflection state quantity Ds increases. In other words, the limit reference value Ut is determined such that the limit reference value Ut becomes smaller as the absolute value |hT| of the deviation becomes larger (i.e., as the deflection state quantity Ds separates away from the first threshold value ds). Here, the predetermined values ds, dr, um, and ur are preset constants.

In step S190, a limit correction value Ua is calculated based on the deflection change amount dD. The limit correction value Ua adjusts (corrects) the limit reference value Ut in order to efficiently reduce the shift (directional shift) between the traveling direction of the vehicle instructed by the driver and the actual traveling direction of the vehicle.

The calculation of the limit correction value Ua will be described with reference to the blowing unit UA. The limit correction value Ua is calculated based on the deflection change amount dD and a calculation map Zua set in advance. A region where the deflection change amount dD is a negative sign (in a case where "dD<0") corresponds to the fact that the deflection state quantity Ds decreases with elapse of time. On the other hand, a region where the deflection change amount dD is a positive sign (in a case where "dD>0") corresponds to the fact that the deflection state quantity Ds increases with time. Since the limit reference value Ut is calculated when the deflection state quantity Ds is less than or equal to the first threshold value ds, the decrease in the deflection state quantity Ds (i.e., "dD<0") corresponds to the fact that the deflection state quantity Ds separates away from a first threshold value ds (i.e., the directional shift of the vehicle increases). On the other hand, the increase in the deflection state quantity Ds (i.e., "dD>0") corresponds to the fact that the deflection state quantity Ds approaches the first threshold value ds (i.e., the directional shift reduces). Therefore, when the deflection change amount dD is less than "0", the limit correction value Ua is calculated so as to increase toward "0" as the deflection change amount dD increases. That is, the limit correction value Ua is a negative value. When the deflection change amount dD is larger than "0", the limit correction value Ua is calculated so as to increase from "0" as the deflection change amount dD increases. That is, the limit correction value Ua is a positive value. An upper limit value um and a lower limit value −um are provided for the limit correction value Ua. In addition, a dead zone "−da to da" is provided. Here, the predetermined values um, da are preset constants.

In step S200, a final limit value (also referred to as "final limit value") Uz is calculated based on the limit reference value Ut and the limit correction value Ua. The final limit value Uz is a target value for restricting the increase slope Kz. The final limit value Uz is determined by adding the limit correction value Ua to the limit reference value Ut. Therefore, when the deflection state quantity Ds decreases and changes in a direction of separating away from the first threshold value ds (in a case where "dD<0"), the final limit value Uz is corrected to a smaller value than the limit reference value Ut as the deflection change amount dD decreases. On the other hand, when the deflection state quantity Ds increases and changes in a direction of approaching the first threshold value ds (in a case where "dD>0"), the final limit value Uz is adjusted to a larger value than the limit reference value Ut as the deflection change amount dD increases.

In step S210, the target increase slope Kz is restricted based on the final limit value Uz. That is, the increase slope Kz before the adjustment is adjusted (restricted) by the final limit value Uz, and the pressure increasing duty ratio Dz of the front wheel on the high friction coefficient side is determined so that the actual increase slope Kz decreases. In step S400, the antiskid control is performed based on the adjusted pressure increasing duty ratio Dz.

When the directional shift is increasing (in a case where "dD<0"), the increase slope Kz is further decreased and adjusted from the limit reference value Ut according to the decrease in the deflection change amount dD based on the limit correction value Ua. Therefore, the traveling direction of the vehicle is immediately stabilized. Furthermore, when the directional shift is reducing (in a case where "dD>0"), the increase slope Kz is further increased and adjusted from the limit reference value Ut according to the increase in the deflection change amount dD based on the limit correction value Ua. As a result, deceleration ability of the vehicle can be ensured. That is, based on the deflection change amount dD, the change in the deflection state quantity Ds is considered, and the limit reference value Ut is finely adjusted. The directional stability and the deceleration ability of the vehicle are efficiently compatible.

<Second Calculation Example in Increase Slope Restricting Block UZ>

Figure 4:
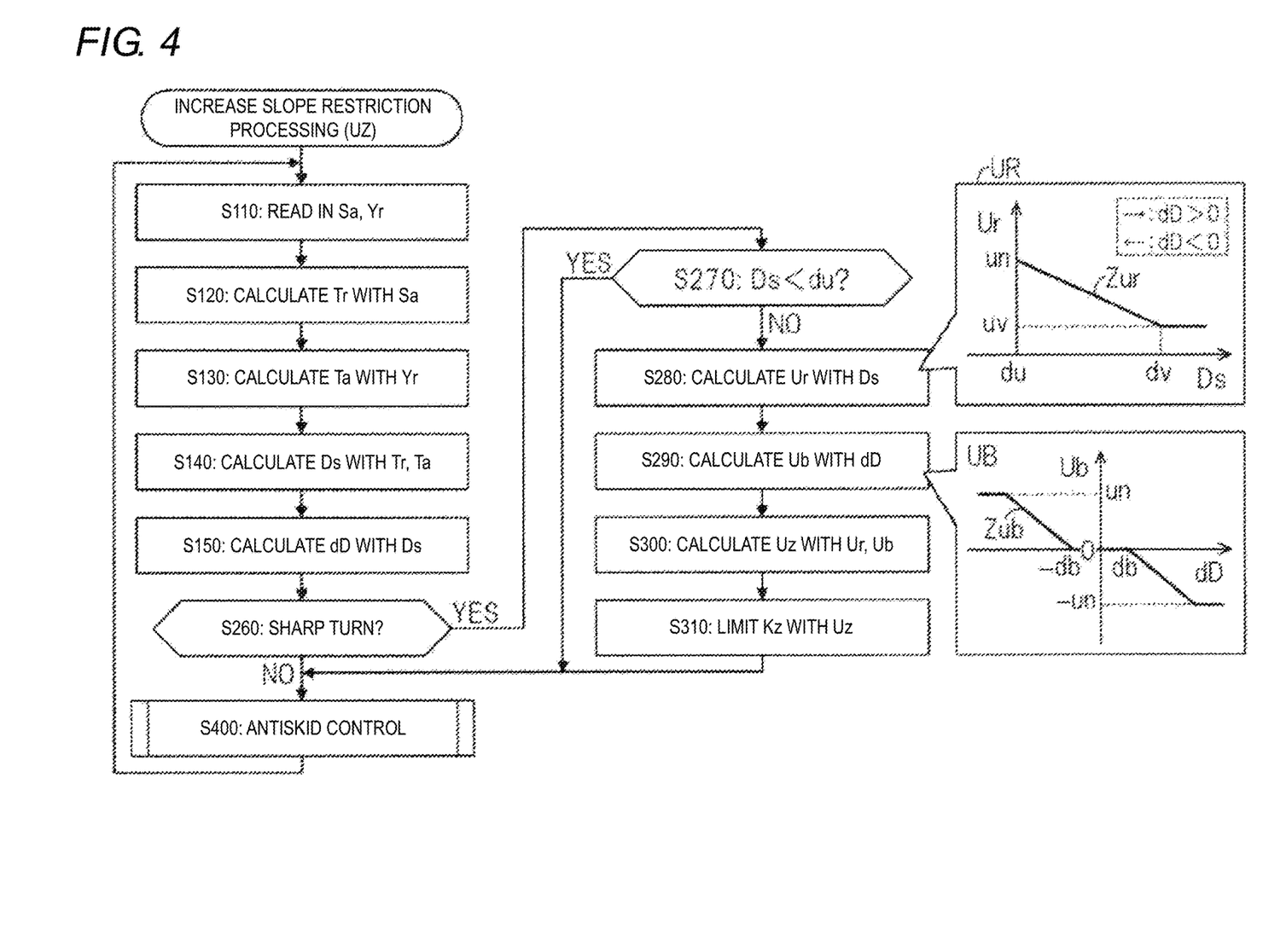
FIG. 4 is a control flowchart for explaining a second calculation example in the increase slope restricting block UZ.

With reference to the control flowchart of FIG. 4, a second calculation processing example in the increase slope restricting block UZ will be described. In the first processing example, the mode in which the increase slope Kz is restricted by the front wheel having the higher friction coefficient when the split road is determined is described. In the second processing example, the increase slope Kz is restricted by the front wheel on the outer side of turning when the sharp turn of the vehicle is determined.

In the second processing example, the processing steps denoted by the same reference symbols as those in the first processing example are the same as those in the first processing example. In step S110, the steering angle Sa and the yaw rate Yr are read. In step S120, a reference turning amount Tr is calculated based on the steering angle Sa. In step S130, the actual turning amount Ta is calculated based on the yaw rate Yr. Here, the physical quantity of the reference turning amount Tr and the physical quantity of the actual turning amount Ta are the same. In step S140, the deflection state quantity Ds (state variable representing the degree of vehicle deflection with respect to the steering angle Sa) is calculated based on the deviation hT between the reference turning amount Tr and the actual turning amount Ta, and the direction sgnTa of the actual turning amount Ta. In step S150, the deflection change amount dD is calculated based on the deflection state quantity Ds. The deflection change amount dD is a state variable representing a change amount in time of the deflection state quantity Ds.

In step S260, "whether or not the turning state of the vehicle is sharp" is determined based on the lateral acceleration Gy (detected value of the lateral acceleration sensor GY). If the actual lateral acceleration Gy is greater than or equal to the predetermined value gy, a sharp turn of the vehicle is determined. On the other hand, when the lateral acceleration Gy is less than the predetermined value gy, the sharp turn of the vehicle is denied. Here, the predetermined value gy is a preset constant.

In step S260, the presence or absence of a sharp turn of the vehicle is determined based on at least one of the yaw rate Yr and the steering angle Sa instead of or in addition to the determination based on the actual lateral acceleration Gy. Specifically, the estimated value of the lateral acceleration is calculated in consideration of the body speed Vx. A sharp turn of the vehicle is determined based on a comparison between the estimated value and the predetermined value gy. That is, the determination on the sharp turn of the vehicle is made based on at least one of the lateral acceleration Gy, the yaw rate Yr, and the steering angle Sa.

In step S260, the turning direction of the vehicle is identified, and the front wheel on the outer side of turning is determined. The turning direction is identified based on a sign ("0", positive, or negative) with respect to the straight traveling direction (correspond to "Sa=0") of the vehicle based on at least one of the lateral acceleration Gy, the yaw rate Yr, and the steering angle Sa. Specifically, the right front wheel WHi is determined as the front wheel on the outer side of turning in the left turn, and the left front wheel WHj is determined as the front wheel on the outer side of turning in the right turn.

In step S270, "whether or not the deflection state quantity Ds is smaller than a second threshold value du" is determined. Here, the second threshold value du is a preset constant. For example, the second threshold value du is determined to be "0". The second threshold value du may be the same value as the first threshold value ds. Alternatively, the second threshold value du may be set as a range having a predetermined width. If "Ds<du: YES", the increase slope Kz is not adjusted (restricted). The process proceeds to step S400, and normal antiskid control is executed as in the case of the split road. That is, the pressure increasing duty ratio Dz, which is equivalent to the case where the sharp turning state is not identified, is calculated.

On the other hand, if "Ds≥du: NO" and negative determination is made in step S270, the process proceeds to step S280. In step S280, a limit reference value Ur (target value) is calculated based on the deflection state quantity Ds.

The calculation of the limit reference value Ur will be described with reference to the blowing unit UR. The limit reference value Ur is calculated based on the deflection state quantity Ds and a calculation map Zur set in advance. In "Ds<du", the limit reference value Ur is not calculated, and the increase slope Kz is not restricted. In "Ds>du", the limit reference value Ur is calculated according to the deflection state quantity Ds. When the deflection state quantity Ds is greater than or equal to the second threshold value du and less than the predetermined value dv, the limit reference value Ur is calculated to decrease from the predetermined value un toward the predetermined value uv as the deflection state quantity Ds increases. When the deflection state quantity Ds is greater than or equal to the predetermined value dv, the limit reference value Ur is calculated to a predetermined value uv (lower limit value). In other words, the limit reference value Ur is determined such that the limit reference value Ur becomes smaller as the absolute value |hT| of the deviation becomes larger (i.e., as the deflection state quantity Ds separates away from the second threshold value du). Here, the predetermined values du, dv, un, and uv are preset constants.

In step S290, a limit correction value Ub is calculated based on the deflection change amount dD. The limit correction value Ub adjusts (corrects) the limit reference value Ur in order to efficiently reduce the shift (directional shift, understeer behavior of the vehicle) between the traveling direction of the vehicle instructed by the driver and the actual traveling direction of the vehicle.

The calculation of the limit correction value Ub will be described with reference to the blowing unit UB. The limit correction value Ub is calculated based on the deflection change amount dD and a calculation map Zub set in advance. Similar to the blowing unit UA, in a region where the deflection change amount dD is negative (in a case where "dD<0"), the deflection state quantity Ds decreases with elapse of time. On the other hand, in a region where the deflection change amount dD is positive (in a case where "dD>0"), the deflection state quantity Ds increases with time. Since the limit reference value Ur is calculated when the deflection state quantity Ds is greater than or equal to the second threshold value du, an increase in the deflection state quantity Ds (i.e., "dD>0") corresponds to the fact that the deflection state quantity Ds separates from the second threshold value du (i.e., the understeer tendency increases). On the other hand, the decrease in the deflection state quantity Ds (i.e., "dD<0") corresponds to the fact that the deflection state quantity Ds approaches the second threshold value du (i.e., the understeer reduces). Therefore, when the deflection change amount dD is less than "0", the limit correction value Ub is calculated so as to decrease toward "0" as the deflection change amount dD increases. That is, the limit correction value Ub is a positive value. When the deflection change amount dD is larger than "0", the limit correction value Ub is calculated so as to decrease from "0" as the deflection change amount dD increases. That is, the limit correction value Ub is a negative value. An upper limit value un and a lower limit value −un are provided for the limit correction value Ub. In addition, a dead zone "-db to db" is provided. Here, the predetermined values un, db are preset constants.

In step S300, a final limit value Uz is calculated based on the limit reference value Ur and the limit correction value Ub. The final limit value Uz is a target value for restricting the increase slope Kz, and is determined by adding the limit correction value Ub to the limit reference value Ur. When the deflection state quantity Ds decreases and changes in the direction of approaching the second threshold value du (in a case where "dD<0"), the final limit value Uz is corrected to a larger value than the limit reference value Ur as the deflection change amount dD decreases. On the other hand, when the deflection state quantity Ds increases and changes in a direction of separating from the second threshold value du (in a case where "dD>0"), the final limit value Uz is adjusted to a smaller value than the limit reference value Ur as the deflection change amount dD increases.

In step S310, similarly to step S210, the target increase slope Kz is restricted based on the final limit value Uz. The increase slope Kz before the adjustment is adjusted (restricted) by the final limit value Uz, and the pressure increasing duty ratio Dz of the front wheels on the outer side of turning is determined so that the actual increase slope Kz decreases. In step S400, the antiskid control is performed based on the adjusted pressure increasing duty ratio Dz.

When the directional shift of the vehicle (in this case, the understeer behavior of the vehicle) is increasing (in a case where "dD>0"), the increase slope Kz is further decreased and adjusted from the limit reference value Ur as the deflection change amount dD increases based on the limit correction value Ub. Therefore, the traveling direction of the vehicle is immediately stabilized. Furthermore, when the understeer behavior is decreasing (in a case where "dD<0"), the increase slope Kz is further increased and adjusted from the limit reference value Ur according to the decrease in the deflection change amount dD based on the limit correction value Ub. As a result, deceleration ability of the vehicle can be ensured. That is, based on the deflection change amount dD, the change in the deflection state quantity Ds is considered, and the limit reference value Ur is finely adjusted. As a result, the directional stability and the deceleration ability of the vehicle are effectively compatible even at the time of sharp turn of the vehicle, as in the case of the split road.

<Difference Between Case where Split Road is Determined and Case where Sharp Turn is Determined>

With reference to the schematic view of FIGS. 5A and 5B (when the vehicle is viewed from above), the difference between the restriction of the increase slope Kz of the high friction coefficient side front wheel on the split road and the restriction of the increase slope Kz of the front wheel on the outer side of turning at the time of sharp turn will be described. Here, the directions of the yaw rate Yr, the steering angle Sa, the lateral acceleration Gy, and the like are represented by a positive sign for the left direction and a negative sign for the right direction, as described above. The turning amount deviation hT is obtained by subtracting the actual turning amount Ta from the reference turning amount Tr.

Figure 5A:
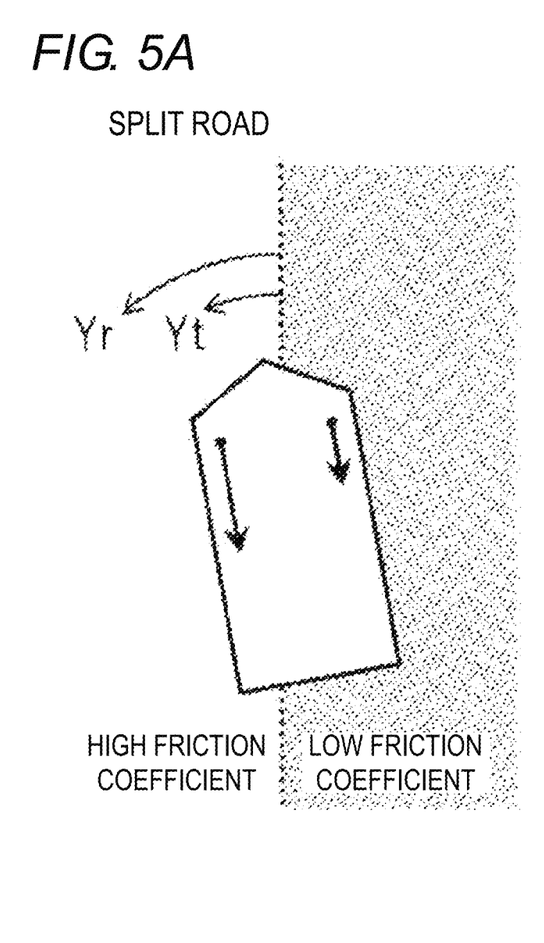
FIGS. 5A and 5B are schematic views for explaining a difference between a case where a split road is determined and a case where a sharp turn is determined.

FIG. 5(a) shows a case where the antiskid control is activated when the vehicle is traveling straight on a split road where the friction coefficient of the road surface differs greatly between the left and right of the vehicle. The friction coefficient of the road surface where the left side wheel contacts the ground is high, and the friction coefficient of the road surface where the right side wheel contacts the ground is low. Since the braking force of the left front wheel is larger than the braking force of the right front wheel, the vehicle is turned in the left direction by such braking force difference, and an actual yaw rate Yr is generated. Since the vehicle is traveling straight, the steering angle Sa is substantially "0", and the reference yaw rate Yt is small. Therefore, there is a relationship of "|YR|>|Yt|". At this time, the value sgnTa (e.g., the value sgnYr) is "+1 (positive)", and the turning amount deviation hT according to "Yt−Yr" becomes a negative value. As a result, the deflection state quantity Ds is calculated as a negative value.

Consider a case where the high and low of the road surface friction coefficient is reversed between the left and the right. Due to the braking force difference, the vehicle is turned right and has a relationship of "|Yr|>|Yt|". At this time, the value sgnTa (e.g., the value sgnYr) is "−1 (negative)", and the turning amount deviation hT becomes a positive value according to the yaw rates Yr and Yt represented as negative values. As a result, the deflection state quantity Ds is calculated as a negative value, as described above. Thus, based on the above assumption (the calculation method of the turning direction and the turning amount deviation hT), a state in which the increase slope Kz needs to be restricted at the time of execution of the antiskid control of the split road corresponds to a case where the deflection state quantity Ds is calculated by a negative sign. Note that the wheel whose increase slope Kz on the split road is adjusted to decrease corresponds to the inner front wheel of the turn.

Figure 5B:
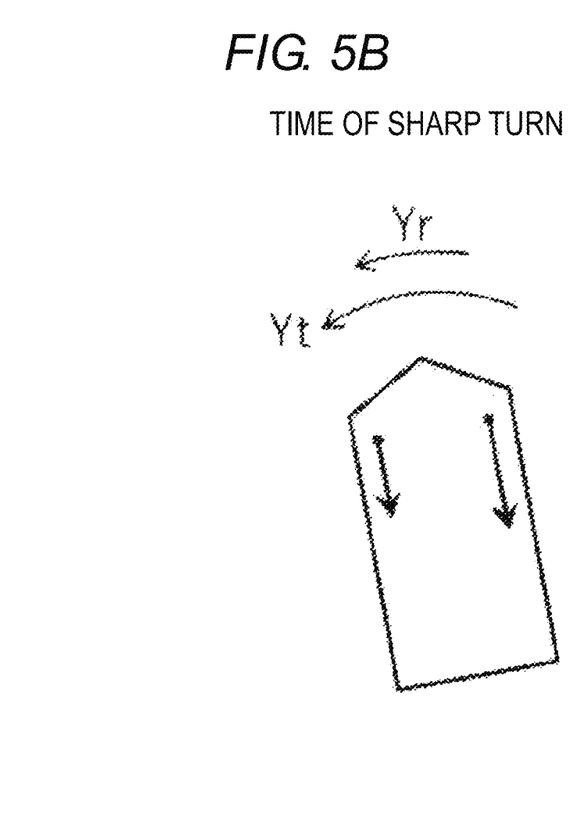

FIG. 5(b) shows a case where the antiskid control is activated when the vehicle is turning sharply to the left direction on a road surface having a uniform friction coefficient. With the turn of the vehicle, a load shift occurs from the turning inner wheel to the turning outer wheel, so that the braking force of the right front wheel becomes larger than the braking force of the left front wheel. The vehicle attempts to go outward in the outer direction of the turn by the braking force difference. The so-called understeer behavior occurs, the turning radius becomes larger than when the wheel is gripping, and the actually generated yaw rate Yr is reduced. Therefore, there is a relationship of "|Yr|<=|Yt|". At this time, the value sgnTa (e.g., the value sgnYr) is "+1

(positive)", and the turning amount deviation hT according to "Yt−Yr" becomes a positive value. As a result, the deflection state quantity Ds is calculated as a positive value.

Consider a case where the turning direction is reversed between the left and the right in a sharp turn of the vehicle. At this time, the value sgnTa (e.g., the value sgnYr) is "−1 (negative)", and the turning amount deviation hT becomes a negative value according to the yaw rates Yr and Yt represented as negative values. As a result, the deflection state quantity Ds is calculated as a positive value, as described above. Thus, contrary to the case of the split road, the state in which the increase slope Kz needs to be restricted at the time of a sharp turn corresponds to a case where the deflection state quantity Ds is calculated by a positive sign. The side on which the increase slope Kz is adjusted to decrease is the front wheel on the outer side of turning opposite to that in the case of the split road.

As described above, the region where the increase slope Kz is adjusted to decrease in the deflection state quantity Ds is reversed in the increase slope suppression on the split road and the increase slope suppression in the sharp turn. Specifically, it becomes symmetric with respect to the threshold values ds and du. The magnitude relationship of the values differs depending on the method of defining the turning direction and the method of calculating the deflection state quantity Ds. Table 1 summarizes the limiting region and the non-limiting region on the split road, and the limiting region and the non-limiting region at the time of a sharp turn. The "limiting region" is a region in which the increase slope Kz is adjusted to decrease, and the "non-limiting region" is a region in which the adjustment is not performed.

The braking control device SC includes an actuator HU that individually adjusts the braking torque Tq of the wheels WH of the vehicle, and a controller ECU that executes an antiskid control that adjusts (adjusts to decrease) the increase slope Kz of the braking torque Tq of the front wheel on the high friction coefficient side through the actuator HU friction coefficient when a road surface having a different friction coefficient is determined between the left and right wheels WH of the vehicle. Furthermore, the braking control device SC includes a steering angle sensor SA that detects a steering angle Sa of the front wheels WHi and WHj, which are steered wheels of the vehicle, and a yaw rate sensor YR that detects a yaw rate Yr of the vehicle.

In the controller ECU of the braking control device SC, the reference turning amount Tr is calculated based on the steering angle Sa, the actual turning amount Ta is calculated based on the yaw rate Yr, and the increase slope Kz is set based on the deviation hT between the reference turning amount Tr and the actual turning amount Ta. Specifically, the deflection state quantity Ds is calculated based on the turning amount deviation hT. In any of the cases described with reference to Table 1, in the region where the increase slope Kz is adjusted to decrease, the limit reference value Ut is calculated to be small as the deflection state quantity Ds separates from the first threshold value ds (predetermined value set in advance). Then, the increase slope Kz is decreased based on the limit reference value Ut. In other words, based on the magnitude of the turning amount deviation hT (the deviation between the direction intended by the driver and the actual traveling direction of the vehicle), the increase slope Kz is decreased from the

TABLE 1

| No. | Turning direction | Turning amount deviation | Split road Restriction | Split road Non-restriction | At time of sharp turn Restriction | At time of sharp turn Non-restriction |
|---|---|---|---|---|---|---|
| 1 | Left direction: positive Right direction: negative | Tr − Ta | Ds ≤ ds | Ds > ds | Ds ≥ du | Ds < du |
| 2 | Left direction: negative Right direction: positive | Tr − Ta | Ds ≥ ds | Ds < ds | Ds ≤ du | Ds > du |
| 3 | Left direction: positive Right direction: negative | −Tr + Ta | Ds ≥ ds | Ds < ds | Ds ≤ du | Ds > du |
| 4 | Left direction: negative Right direction: positive | −Tr + Ta | Ds ≤ ds | Ds > ds | Ds ≥ du | Ds < du |

In the signs of the turning direction, the turning direction is positive on the left and negative on the right in No. 1 and No. 3. On the other hand, in No. 2 and No. 4, the turning direction is negative on the left and positive on the right. The calculation of the deflection state quantity Ds is based on the above equation (1) in No. 1 and No. 2. On the other hand, in No. 3 and No. 4, the deflection state quantity Ds is calculated by the following equation (2).

$$Ds = \text{sgn}Ta \cdot (-Tr + Ta) \quad \text{Equation (2)}$$

As a result, in the restriction adjustment of the increase slope Kz, No. 1 and No. 4 are the same, and No. 2 and No. 3 are the same.

<Operation/Effect>

The operation and effect of the present invention will be summarized.

increase slope Kz of a case where the split road is not determined the larger the shift.

When the deviation hT increases (in a case where the directional shift is increasing and "dD<0"), the increase slope Kz is corrected to be small. When the turning amount deviation hT is increasing with time change, the increase slope Kz is not sufficiently decreased. For this reason, the change tendency of the turning amount deviation hT is determined based on the deflection state quantity Ds, and when the turning amount deviation hT is increasing, the increase slope Kz set based on the turning amount deviation hT is further decreased and corrected. The directional shift due to the braking force difference thus can be corrected in a short time. For example, the change tendency of the turning amount deviation hT is determined based on a differential value (deflection change amount) dD of the deflection state quantity Ds.

When the deviation hT is reduced (in the case where the directional shift is reducing and converging, and "dD>0"), the increase slope Kz is corrected to be larger. When the turning amount deviation hT is reducing with time change, the decrease of the increase slope Kz is already in a sufficient state. Therefore, the decrease adjustment of the increase slope Kz is becoming unnecessary, so that the increase slope Kz set based on the turning amount deviation hT is increased and corrected. The deceleration action of the front wheels on the high friction coefficient side is thus gradually increased, and the deceleration of the vehicle can be secured.

The braking control device SC includes an actuator HU that individually adjusts the braking torque Tq of the wheels WH of the vehicle, and a controller ECU that executes an antiskid control that adjusts (adjusts to decrease) the increase slope Kz of the braking torque Tq of the front wheel on the outer side of turning of the vehicle through the actuator HU when a sharp turn of the vehicle is determined. Similar to the braking control device SC activated on the split road, the braking control device SC includes a steering angle sensor SA that detects the steering angle Sa of the steered wheels WHi and WHj of the vehicle, and a yaw rate sensor YR that detects the yaw rate Yr of the vehicle.

In the controller ECU of the braking control device SC, the reference turning amount Tr is calculated based on the steering angle Sa, the actual turning amount Ta is calculated based on the yaw rate Yr, and the increase slope Kz is set based on the deviation hT between the reference turning amount Tr and the actual turning amount Ta. Similar to the description made above, in any of the cases in Table 1, in the region where the increase slope Kz is adjusted to decrease, the limit reference value Ur is calculated to be small as the deflection state quantity Ds separates from the second threshold value du (predetermined value set in advance), and the increase slope Kz is decreased based on the limit reference value Ur. As the degree of understeering of the vehicle increases, the increase slope Kz is decreased from the increase slope Kz of a case where a sharp turn is not determined. Note that the second threshold value du may be the same value as the first threshold value ds, or may be a different value.

For example, the first threshold value ds is set to a value less than "0", and the second threshold value du is set to a value larger than "0". In this case, the decrease adjustment of the increase slope Kz is not performed in the range of "ds<Ds<du". In the braking control device SC which can execute both the "decrease adjustment of the increase slope Kz on the split road" and the "decrease adjustment of the increase slope Kz in the sharp turn", the respective control regions are clearly separated by the above ranges. For this reason, the respective decrease adjustment can be reliably performed.

The change tendency of the turning amount deviation hT is determined based on the deflection state quantity Ds. When the deviation hT increases (when the understeer tendency sequentially increases, and when "dD>0"), the increase slope Kz is corrected to be small. When the turning amount deviation hT is increasing in the time change, the decrease of the increase slope Kz is not sufficient, and thus the increase slope Kz set based on the turning amount deviation hT is further decreased and corrected when the turning amount deviation hT is increasing. The understeer thus can be suppressed in a short time.

When the deviation hT is reduced (when the understeer tendency is converging and "dD<0"), the increase slope Kz is corrected to be large. When the turning amount deviation hT is reducing with time change, the decrease of the increase slope Kz is sufficient, and thus the increase slope Kz set based on the turning amount deviation hT is increased and corrected when the turning amount deviation hT is reducing. The front wheel braking force on the outer side of turning is thereby effectively used, and the deceleration of the vehicle can be improved.

<Other Embodiments>

Other embodiments will be described below. Other embodiments also have the same effects as above.

In the embodiment described above, the target increase slope Kz is restricted based on the final limit value Uz (target value), the pressure increasing duty ratio Dz is adjusted, and the actual increase slope Kz is decreased. Instead, the pressure increasing duty ratio Dz can be directly adjusted to increase based on the deflection state quantity Ds. That is, the final limit value Uz is not calculated, and the actual increase slope Kz is decreased based on the deflection state quantity Ds.

In the embodiment described above, a diagonal fluid passage is exemplified as the two-system fluid passage. Instead, a front-back type (also referred to as "H-type") configuration may be adopted. In the front-back fluid passage, the wheel cylinders CWi and CWj for the front wheels are fluidly connected to the first master cylinder fluid passage HM1 (i.e., the first system). In addition, the wheel cylinders CWk and CWl for the rear wheels are fluidly connected to the second master cylinder fluid passage HM2 (i.e., the second system).

In the embodiments described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiments described above, the hydraulic braking control device SC using the brake fluid BF has been exemplified. Instead, an electric braking control device SC that does not use the brake fluid BF is employed. In this device, the rotation of the electric motor is converted into linear power by a screw mechanism or the like, and the friction member is pressed against the rotating member KT. In this case, the braking torque Tq is generated by the pressing force of the friction member against the rotating member KT generated by using the electric motor as a power source instead of the brake fluid pressure Pw.

The invention claimed is:

1. A braking control device of a vehicle comprising:
   an actuator that individually adjusts a braking torque of a wheel of the vehicle;
   a controller that executes an antiskid control that adjusts an increase slope of a braking torque of a front wheel on a high friction coefficient side through the actuator when a road surface having a different friction coefficient between left and right wheels of the vehicle is determined;
   a steering angle sensor that detects a steering angle of a steered wheel of the vehicle; and
   a yaw rate sensor that detects a yaw rate of the vehicle, wherein
   the controller is configured to:

calculate a reference turning amount based on the steering angle, calculate an actual turning amount based on the yaw rate, set the increase slope based on a deviation between the reference turning amount and the actual turning amount, and correct the increase slope to be smaller when the deviation is increased.

2. A braking control device of a vehicle comprising:

an actuator that individually adjusts a braking torque of a wheel of the vehicle;

a controller that executes an antiskid control that adjusts an increase slope of a braking torque of a front wheel on a high friction coefficient side through the actuator when a road surface having a different friction coefficient between left and right wheels of the vehicle is determined;

a steering angle sensor that detects a steering angle of a steered wheel of the vehicle; and a yaw rate sensor that detects a yaw rate of the vehicle, wherein the controller is configured to:

calculate a reference turning amount based on the steering angle, calculate an actual turning amount based on the yaw rate, set the increase slope based on a deviation between the reference turning amount and the actual turning amount, and correct the increase slope to be larger when the deviation is reduced.

3. A braking control device of a vehicle comprising:

an actuator that individually adjusts a braking torque of a wheel of the vehicle;

a controller that executes an antiskid control that adjusts an increase slope of a braking torque of a front wheel on an outer side of turning of the vehicle through the actuator when a sharp turn of the vehicle is determined;

a steering angle sensor that detects a steering angle of a steered wheel of the vehicle; and a yaw rate sensor that detects a yaw rate of the vehicle, wherein the controller is configured to:

calculate a reference turning amount based on the steering angle, calculate an actual turning amount based on the yaw rate, set the increase slope based on a deviation between the reference turning amount and the actual turning amount, and correct the increase slope to be smaller when the deviation is increased.

4. A braking control device of a vehicle comprising:

an actuator that individually adjusts a braking torque of a wheel of the vehicle;

a controller that executes an antiskid control that adjusts an increase slope of a braking torque of a front wheel on an outer side of turning of the vehicle through the actuator when a sharp turn of the vehicle is determined;

a steering angle sensor that detects a steering angle of a steered wheel of the vehicle; and a yaw rate sensor that detects a yaw rate of the vehicle, wherein the controller is configured to:

calculate a reference turning amount based on the steering angle, calculate an actual turning amount based on the yaw rate, set the increase slope based on a deviation between the reference turning amount and the actual turning amount, and correct the increase slope to be larger when the deviation is reduced.

* * * * *